United States Patent
Easler, Sr.

(10) Patent No.: US 6,330,955 B2
(45) Date of Patent: *Dec. 18, 2001

(54) REUSABLE ICE SUBSTITUTE IN A CAR

(76) Inventor: Vincent Michael Easler, Sr., 904 Sunnyside Dr., West Mifflin, PA (US) 15122

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/477,634

(22) Filed: Jan. 5, 2000

(51) Int. Cl.$^7$ .................................................... B65D 25/04
(52) U.S. Cl. .......................... 220/507; 220/723; 220/906
(58) Field of Search .................................... 220/906, 507, 220/721, 723; 62/457.1, 530

(56) References Cited

U.S. PATENT DOCUMENTS

| | | | |
|---|---|---|---|
| 2,460,765 | * | 2/1949 | Palaith . |
| 3,534,884 | * | 10/1970 | Suter . |
| 3,791,159 | * | 2/1974 | Devlin ........................................ 62/68 |
| 3,883,046 | * | 5/1975 | Thompson et al. ................ 222/386.5 |
| 3,902,624 | * | 9/1975 | Stephenson ........................... 220/721 |
| 4,719,028 | * | 1/1988 | James et al. ........................... 252/70 |
| 4,964,402 | * | 10/1990 | Grim et al. ............................... 602/2 |
| 5,235,823 | * | 8/1993 | Coker ..................................... 62/530 |
| 5,335,813 | * | 8/1994 | Qi .......................................... 220/524 |
| 5,357,761 | * | 10/1994 | Schauer .................................... 62/56 |
| 5,492,244 | * | 2/1996 | Kim ....................................... 220/906 |
| 5,522,239 | * | 6/1996 | Schwartz et al. .................... 62/457.5 |
| 5,967,315 | * | 10/1999 | Langtry, II ...................... 206/315.11 |

* cited by examiner

Primary Examiner—Stephen Castellano

(57) ABSTRACT

A container filled with a freezable mixture for use in refrigeration or temporary cooling purposes. The container of the invention is generally one of the common metal cylindrical containers or cans but may also include both plastic and glass bottles. Normally such containers are unsuitable for holding a freezable mixture due to the expansion of the freezing mixture causing the deformation or rupture of said container. By using a fully soluble eutectic mixture, such as propylene glycol and water mixed at a ratio of 20% propylene glycol, an ice slurry is formed at the temperatures normally present in home freezers. A small gas space is also needed for expansion and contraction of the container contents. When a can or other inwardly flexible container is utilized, a positive pressure within the container, relative to the external pressure, can be maintained with a gas charge.

Alternative to the use of a fully soluble eutectic mixture and a gas space, a compressible member may be inserted into the container to protect the container from the expansion and contraction of the freezing liquid.

In addition to the advantages achieved through the use of containers filled with freezable liquid over using water/ice coolant which have been found in the prior art, use of containers as prescribed by the present invention provide for reduced production costs, easier storage in existing coolers which are designed to hold similar packaging, increased cooling effectiveness, and a sealed bio-resistant exterior.

6 Claims, 3 Drawing Sheets

Container for holding a freezable liquid

Figure 3
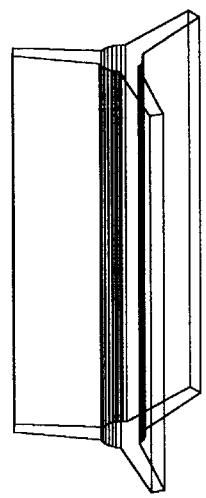
←———5
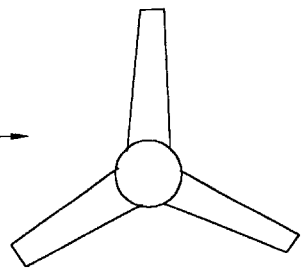
top view piece #5
Container for holding a freezable liquid

REUSABLE ICE SUBSTITUTE IN A CAR

BACKGROUND OF THE INVENTION

Description of Prior Art

Containers filled with freezable liquid for use as refrigeration or temporary cooling, are available at most retail outlets today. Described as "reusable ice substitutes", they are either soft flexible plastic envelopes or semi-rigid plastic blocks. The soft plastic envelopes are weak and insecure and can carry biological contaminants. The plastic block has a thick plastic container which insulates the frozen liquid from the space to be cooled, bulges and deforms when frozen, and can carry biological contaminants on the plastic exterior.

Objects and Advantages

Containers that are commonly used for liquid storage, are not normally suited to the storage of a freezable liquid. The containers burst or deform from the expansion and contraction of the contents. The object of this invention is to adapt the commonly used containers for the storage of freezable liquids for use in temporary cooling or refrigeration. The primary advantage is that normal manufacturing, filling, and sealing methods and machinery can be utilized. Secondary advantages include: convenient shapes, increased durability of the exterior, increased heat transfer rates, and resistance to biological contaminants.

DRAWINGS

Figure 1:
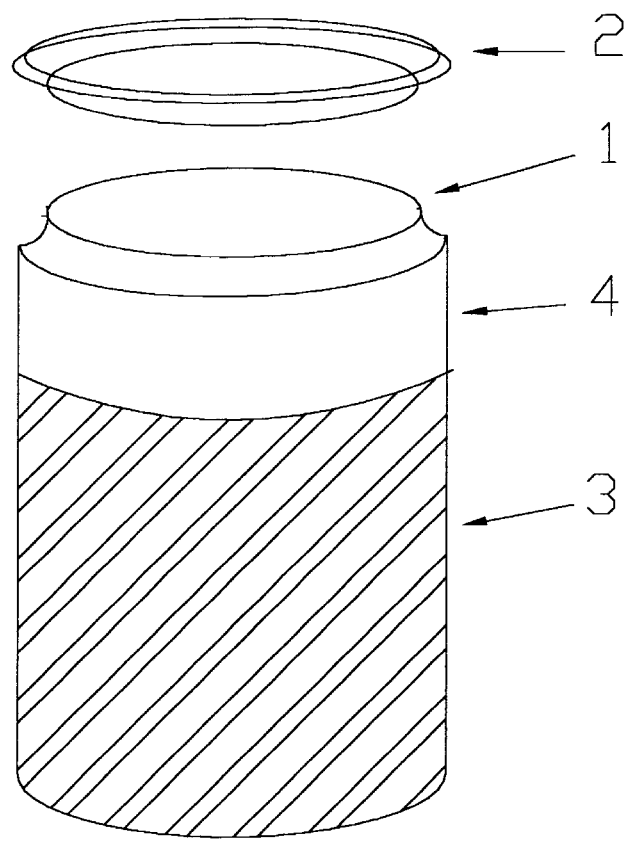
Figure 2:
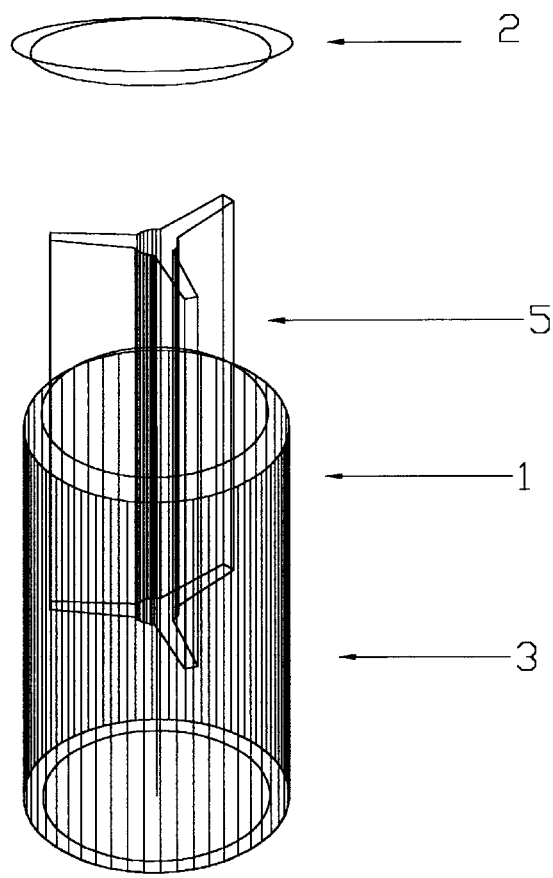

FIG. 1—Main Embodiment
FIG. 2—Alternate Embodiment
FIG. 3—Compressible Member

REFERENCE NUMERALS IN DRAWINGS

1 Container
2 Lid
3 Freezable liquid
4 Gas space
5 Compressible Member

SUMMARY OF THE INVENTION

DESCRIPTION AND OPERATION

Main Embodiment

A container (1) filled with a freezable liquid (3) and sealed with a lid (2). The container (1) of the invention is a common two piece aluminum can. Normally such containers are unsuitable for holding a freezable mixture due to the expansion of the freezing mixture causing the deformation or rupture of said container. By using a 20% propylene glycol and water mixture(3) and a gas space(4), the container is protected from deformation and rupture at normal home freezer and deep freezer temperatures. A fully soluble two component solution such as a 20% mixture of propylene glycol and water forms a solid-liquid mixture or ice slurry when the temperature of the can is lowered in a freezer unit. The ice slurry forms as solid (frozen) water separates from the liquid mixture. The remaining liquid water becomes more concentrated with propylene glycol. If the temperature is lowered further, more solid water separates out from the mixture until the remaining liquid mixture reaches its eutectic mixture. When the eutectic mixture is reached and the temperature is lowered further, the remaining propylene glycol and water will solidify and rupture the can. Since the depression of the freezing point of the mixture is below the cooling capabilities and normal settings of home freezer units, the eutectic mixture and associated temperature are not reached. The can contains a solid-liquid mixture at the minimum temperature of intended use. A gas charge, normally nitrogen or carbon dioxide should be inserted into the container prior to the installation of the lid (2) to maintain a positive internal pressure relative to the exterior pressure through out the intended operating temperature range and environment. This gas charge procedure is typical in most canning/packing operations of carbonated beverages and canned fruit juices.

Alternative Embodiments

Alternative to the use of a fully soluble two component solution and gas space as referenced above, a compressible member(5), may be inserted into the container (1) with the liquid (3) to protect the container (1) from the expansion of the freezing liquid. Said compressible member (5) would be located within the container(1) in such a manner to prevent the freezing liquid (3) from pressing upon opposing interior walls of the container and deforming or rupturing the container (1). In the cylindrical cross section of the container (1), a centrally located core with at least three radial protrusions installed lengthwise in the container would effectively protect the container (1). A gas charge, normally nitrogen or carbon dioxide should be inserted into the container (1) prior to the installation of the lid (2) to maintain a positive internal pressure relative to the exterior pressure through out the intended operating temperature range and environment. This gas charge procedure is typical in most canning/packing operations of carbonated beverages and canned fruit juices.

Alternative to the use of a two piece aluminum can; a glass bottle, plastic bottle, or three piece steel can may be used as a container (1) with a suitable lid (2).

Container Uses

The container is suitable for use as an ice substitute for temporary cooling or refrigeration. In addition to the advantages achieved through the use of containers filled with freezable liquid over using water/ice coolant which have been found in the prior art, use of containers as prescribed by the present invention, provide for reduced production costs through the use of normal manufacturing, filling and sealing methods and machinery, easier storage in existing coolers which are designed to hold similar packaging, increased cooling effectiveness through higher heat transfer rates, increased durability, and a sealed bio-resistant exterior.

DISCLOSURE OF PRIOR ART

U.S. Pat. No. 4,656,840
U.S. Pat. No. 5,582,028
U.S. Pat. No. 4,324,111
U.S. Pat. No. 4,311,022

I claim:
1. An energy storage device for use in temporary refrigeration and cooling applications, said device comprising:
   a cylindrical metal container;
   a freezable material placed within said container;
   a compressible means placed within said container such that the compressible means protects the container from the expansion of the freezable material;

where the compressible means is comprised of a foam;

a lid suitably adapted to close and seal said container.

2. The energy storage device as in claim 1, where the freezable material is comprised of a fully soluble eutectic mixture.

3. The energy storage device as in claim 1, where the freezable material is comprised of propylene glycol and water.

4. The energy storage device as in claim 1, where the freezable material is comprised of ethylene glycol and water.

5. The energy storage device as in claim 1, where the freezable material is comprised of alcohol and water.

6. The energy storage device as in claim 1, where the freezable material is comprised of antifreeze and water.

* * * * *